United States Patent Office 3,799,958
Patented Mar. 26, 1974

3,799,958
ESTER SYNTHESIS FOR PREPARATION OF SPECIFIC GLYCERIDES
Lawrence C. Mitchell, Southfield, Mich., assignor to Ethyl Corporation, Richmond, Va.
No Drawing. Filed July 21, 1971, Ser. No. 164,915
Int. Cl. C07c 3/00; C11c 69/30
U.S. Cl. 260—410.7                                4 Claims

ABSTRACT OF THE DISCLOSURE

Dipolar, aprotic solvents such as dimethyl sulfoxide are efficaciously employed in the reaction of alkali metal carboxylates with organic halides. For the formation of specific triglycerides, glyceryl mono- or dihalides are preferably employed. Reaction sequences have been devised for preparation of triglycerides whereby undesirable acyl group migration does not occur.

BACKGROUND OF THE INVENTION

Specific triglycerides are those having acid groups individually placed in known positions on the glycerol. It is believed that technology is not presently available in the prior art for preparing specific triglycerides on a large scale. Presently preparation of such products is rather complex. An example of the complexity of known processes is Quinn et al., J. Amer. Oil Chemists Soc. 44, 439 (1967). This invention is directed to the provision of simpler means for preparing specific triglycerides which offer promise for use in production of synthetic fats or oils on a comparatively large scale.

This invention comprises the reaction of glycerol halides with salts of carboxylic acids. Prior art publications dealing with various facets of the reaction of alkyl halides and acid salts are as follows: Mills et al., Chem. and Ind. 2144 (1962); Hennis et al., I. and EC. Prod. Res. and Dev., 7, 96 (1968); Hennis et al., Ibid, 6, 193 (1967); Carreau, Bulletin de LaSociete Chemique de France, 4104, 4107 and 4111 (1970).

SUMMARY OF THE INVENTION

This invention is directed to a number of aspects including the efficacious use of dipolar, aprotic solvents in the reaction of alkyl halides with carboxylic acid salts. Accordingly, an important feature of this invention is a process for the formation of an ester, said process comprising reacting a glyceryl halide with an alkali metal carboxylate, said glyceryl halide having the formula

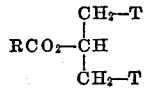

wherein T is selected from the class consisting of

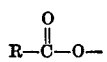

wherein R is a fatty acid group of from one to about 26 carbon atoms, and chlorine and bromine, such that at least one T is selected from chlorine and bromine, said alkali metal carboxylate having the formula

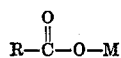

wherein R is as defined above and M is an alkali metal; said process being conducted in the presence of a dipolar, aprotic solvent.

Other aspects of this invention include utilization of such a process in the formation of specific triglycerides, that is, synthetic fats or oils.

DESCRIPTION OF PREFERRED EMBODIMENTS

This invention is primarily directed to the use of two classes of glyceryl halides, unsymmetrical glyceryl monohalides, and symmetrical glyceryl dihalides, wherein the carbon atom or atoms which are not bound to halogen are bound to ester groups

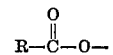

Unsymmetrical glyceryl monohalides have a halogen on a terminal carbon atom and alike or different ester groups on the middle and other terminal carbon. Symmetrical glyceryl dihalides have an ester group on the middle carbon and alike or different halogen atoms on each terminal carbon. In general, any halide of the above classes can be used. Preferably, however, the halogen atom or atoms therein are selected from chlorine or bromine; these are in general more readily available. Moreover, because the chlorine compounds are usually less expensive they are more preferred.

In a major aspect of this invention, the above described halides are made to react with salts of carboxylic acids. The exact structure of the organic group bonded to the carboxy linkage in the acid is not critical so long as the group is stable under the reaction conditions employed, does not retard the process by entering into competing side reactions, or cause undue restraint by steric hindrance. Inasmuch as a major feature of this invention comprises the provision of means to prepare synthetic triglycerides, it is preferred that the acid be a fatty acid. Thus, the acid may be a straight chain alkyl acid having from about 2 to about 26 carbon atoms. Thus, acidic, butyric, isovaleric, caproic, caprylic, capric, lauric, myristic, palmitic, stearic, arachidic, behenic, lignoceric, and cerotic acid salts can be used as reactants in this invention. The metal in the salt is not critical. Preferably, monovalent metal salts are used and for economic reasons, alkali metal salts are more preferred. Of these, sodium and potassium salts are of choice and since they are usually least expensive, sodium salts are the more highly preferred reactants. It is not necessary for the acid to be saturated and olefinic acid salts can be employed. For the preparation of synthetic fats or oils, it is preferred that olefinic acids have 10 carbon atoms or more be employed for these are the ones which have been identified in nature. Oleic, linoleic, and linolenic acid salts are exemplary reactants employable in this invention. Others are mentioned in Advanced Organic Chemistry, Fieser and Fieser, Reinhold Publishing Company, New York, N.Y. (1961), pp. 985 et seq. Naturally occurring olefinic acids are listed in a table there on page 985. That table is incorporated by reference herein as if fully set forth.

Although the monohalides react with the acid salts in a 1:1 ratio and the dihalides react with the acid salts in a 1:2 ratio, it is not necessary for this process to contact the reactants in mole equivalent amounts. Accordingly, an excess of either reactant can be employed. Usually the acid salt is the least expensive reactant and accordingly if an excess of one reactant is desirable, then one usually uses more than stoichiometric quantities of the acid salt. Moreover, when one employs a dihalide, a large excess of that substance may inhibit disubstitution. For the above reasons, one usually employs from about 1.0 to 3, 4 or more moles of acid salt per each mole of halogen atom to be reacted. Greater or lesser amounts of acid salt can be employed if desired.

As indicated above, the process of this invention is conducted in the presence of a dipolar, aprotic solvent. Typical solvents of this type are dimethyl sulfoxide, dimethylformamide, sulfolane, dimethylacetamide, N- methylpyrrolidone, sulfur dioxide, hexamethylphosphoramide, and the like. The exact amount of dipolar, aprotic solvent is not critical and one employs at least enough for the material to exhibit its beneficial effect. It is not necessary, especially at the early stages of the reaction, for the reactants to become completely dissolved in the solvent. In other words, this reaction proceeds well even when slurries are made to react. In general, one uses from about ½ to 5, 10, or more moles of dipolar, aprotic substance per each mole of acid salt used. There is no real upper limit on the amount, this being governed by such considerations as size of the reaction vessel, economics, and the like.

For best results, in many instances the process of this invention is conducted using substantially dry reactants and dipolar, aprotic substance. By substantially dry I mean the reaction mass should not contain more than about ⅒ volume percent water. In many instances, one can use reactants and dipolar, aprotic substance as they are commercially available. In general, for laboratory scale runs, drying the commercial materials overnight in the presence of phosphorus pentoxide is usually more than sufficient to insure that a detrimental amount of water will not be present. For larger scale operations, an equivalent amount of drying can be conducted, if it is desired to take such precautionary measures.

The temperature employed when conducting the reaction is not critical; the temperature is selected which affords a reasonable rate of reaction and which does not cause undue decomposition of the starting materials or product(s). The process is operable at ambient temperatures but in some instances the rate of reaction requires a fairly prolonged reaction time. In such instances, one can use an elevated temperature, and it is usually efficacious to employ a temperature between ambient and the normal boiling point of the reaction system. If desired, temperatures between 40–200° C. can be used and in many instances one employs a temperature between about 50° and 160° C.

The reaction pressure is not critical. The process proceeds well at ambient pressures and accordingly, atmospheric is the pressure of choice. If desired, one can use subatmospheric and superatmospheric pressures, but it is not necessary to do so. The nature of the atmosphere is not critical; as a precautionary measure, one may use a blanket of an inert gas if desired. Typical inert gases which may be used are nitrogen, argon, neon and the like.

The reaction time is not critical and is dependent to some extent on the other reaction conditions such as temperature, and on the inherent reactivity of the reagents. Generally, high temperatures favor shorter reaction times. If desired, the extent of reaction can be followed by withdrawing and analyzing samples at intervals. Usually reaction times of from one to 200 hours are sufficient.

EXAMPLE I

A dry three-necked round bottom flask was charged with 2.40 g. (25 mmoles) of sodium propionate, 4.86 g. (25 mmoles) of 3-chloro-1,2-propanediol diacetate and 25 ml. of dimethyl sulfoxide (DMSO). The flask was equipped with a thermometer, magnetic stirrer, reflux condenser, nitrogen blanket and serum stopple.

The mixture was stirred at room temperature a few minutes and a sample (0.25 ml.) taken by means of a syringe through the stopple. The mixture was heated to 75° and monitored by taking additional samples (0.25 ml.) periodically. The total reaction time was 117 hours.

The reaction mixture was cooled to room temperature, diluted to approximately 300 ml. with ether, let stand for several hours and filtered. The collected solid was washed with ether and dried in a desiccator at aspirator pressure, wt. 1.40 g. The solid gave a strong positive test for chloride with silver nitrate solution. An IR spectrum indicated it still contained sodium acetate.

The filtrate from above was stripped to a volume of about 70 ml. on a rotary evaporator. The residue was diluted to 200 ml. with hexane and extracted with 50 and 20 ml. portions of water to remove the DMSO. The aqueous extracts were washed once with hexane and the combined hexane solutions dried over magnesium sulfate and stripped of solvent on a rotary evaporator. The residual liquid was distilled in a tiny distillation apparatus through a short Vigreux. The first cut, B.P. 95–102°/0.6 mm., weighed 0.80 g. The second (and last) cut, B.P. 102°/0.6 mm., weighed 1.88 g. Both cuts were quite pure product by VPC with minor amounts of impurity. The NMR and IR spectra of the second cut were consistent with the expected product, glyceryl 3-propionate-1,2-diacetate (yield, 48.4 percent).

EXAMPLE II

The procedure was essentially the same as the above example. The charge was 4.80 g. (50 mmoles) of sodium propionate, 4.28 g. (25 mmoles) of 1,3-dichloro-2-propyl acetate and 25 ml. of DMSO. The reaction was run at a temperature of 80–86° and monitored by taking samples for VPC.

After 112 hours, whereupon the reaction appeared complete by VPC, the reaction mixture was cooled and worked up. It was diluted with 200 ml. of 1:1 hexane-ether and extracted with water. The water-DMSO layer was extracted with 50 ml. 1:1 hexane-ether. The combined hexane-ether layers were extracted three times with water and dried over magnesium sulfate.

The drying agent was filtered off and washed with ether-hexane and the filtrate stripped on a rotary evaporator. The residue was distilled through a short Vigreaux. The first cut, B.P. 101–104°/0.5 mm., weighed 0.83 g. The second (and last) cut, B.P. 100–103°/0.35 mm., weighed 2.67 g. VPC showed one impurity (<5 percent). IR and NMR spectra of the second cut were consistent with the expected product, glyceryl 2-acetate-1, 3-dipropionate (yield, 56.8 percent—both cuts).

EXAMPLE III

A flame dried, 500 ml. 3 neck, creased flask equipped with a mechanical stirrer, reflux condenser and filled with a nitrogen blanket was employed. To the flask was charged 3.93 g. (10 mmoles) of 1,3-dichloro-2-propyl oleate, 6.12 g. (20 mmoles) of sodium stearate and 100 ml. of dry dimethylformamide (DMF). The mixture was heated to 145–150° with stirring for 1¾ hours and then refluxed gently for two hours.

The product was cooled and diluted with 500 ml. ether. The mixture was filtered and the collected solid washed with ether and dried, wt. 1.7 g. (theory for NaCl, 1.06 g.).

The DMF solution had deposited crystals which were filtered off, washed twice with DMF-H₂O, several times with water and dried in vacuo, wt. 5.2 g. (Sample A).

The filtrate had deposited more solid due to the addition of water. This sticky semisolid material was filtered off, washed with water and dissolved in hexane while wet. The hexane solution was decanted off and filtered and dried over MgSO₄. The drying agent was filtered off and washed with hexane and the filtrate cooled in the freezer (Sample B).

The IR and NMR of Sample A was consistent with the structure of the expected product, 2-oleoyl-1,3-distearin. Yield based on Sample A, 57 percent.

Sample B was a contaminated portion of the desired product.

EXAMPLE IV

An oven-dried three necked creased flask was equipped with a magnetic stirrer, reflux condenser and thermometer. It was charged, under nitrogen, with 4.92 g. (8.37 mmoles) of 3-chloropropane-1,2-diol dipalmitate, 3.06 g. (10 mmoles) of sodium stearate and 50 ml. of hexamethylphosphoramide (HMPA), dried over Type 4A Molecular Sieves. The mixture was stirred and heated, under nitrogen, over 1½ hr. to 122°. It was maintained at 122–130° for an additional 1½ hr. The mixture was cooled to room temperature.

Work-up comprised diluting with about 300 ml. of water and 300 ml. of hexane. The resulting emulsion was heated to the boiling point of hexane to separate the layers. The warm aqueous layer was extracted twice more with hot hexane. The combined hexane extracts were dried briefly (while warm) over sodium sulfate. The drying agent was filtered off and washed with hexane. The filtrate (including washings) was cooled in the refrigerator overnight after concentrating to a smaller volume. Crystals of stearoyl-1,2-dipalmitin product had deposited and were filtered off, washed with cold hexane and dried in air; wt. 4.10 g. (58.5 percent), M.P. 61.5–63.5° (reported M.P. 62.7°, A. E. Bailey, Melting and Solidification of Fats, p. 165).

The filtrate was further concentrated and cooled in the freezer overnight. More product crystals were filtered, washed and dried as before, wt. 0.44 g.; M.P. 59–62°, Total yield 64.9 percent.

EXAMPLE V

A flame-dried nitrogen flushed 3-necked Morton flask was charged with 3.96 g. (10 mmoles) of 1,3-dichloro-2-propyl stearate and 6.12 g. (22 mmoles) of sodium palmitate. Hexamethyl phosphoramide (50 ml., dried over Type 4A Molecular Sieves) was added. The mixture was stirred and heated under nitrogen to 120° in 1¼ hr. and held at 120–130° for 4¼ hr.

The mixture was worked up the same as in Example IV. Some spillage occurred during work-up. The hexane solution finally obtained was concentrated and cooled to room temperature. Product crystals of 2-stearoyl-1,3-dipalmitan were isolated as in Example IV, wt. 4.53 g., M.P. 64–67° (reported M.P. 68°), yield 54.3 percent. The filtrate was further concentrated and cooled in a freezer. This second crop of crystals was discarded.

Following the procedures of the above examples the following reactions can be made to take place:

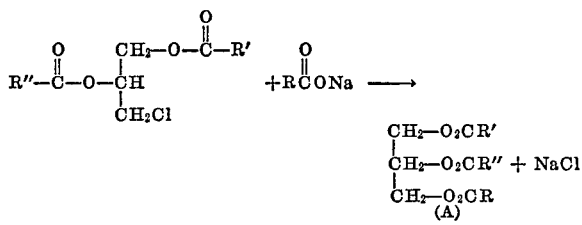

| RCOOH | R'COOH | R"COOH |
|---|---|---|
| (a) Butyric acid | Butyric acid | Butyric acid. |
| (b) Caproic acid | Caproic acid | Do. |
| (c) Stearic acid | Palmitic acid | Oleic acid. |
| (d) Stearic acid | Stearic acid | Cerotic acid. |
| (e) Oleic acid | Oleic acid | Linoleic acid. |
| (f) Linoleic acid | Myristic acid | Oleic acid. |

The above reactions are conducted using 0.9 to 4.0 moles of acid salt per each mole of unsymmetric glyceryl monohalide and from 0.5 to 10 moles (per mole of salt) of dipolar, aprotic solvents, dimethyl sulfoxide, sulfolane, dimethylformamide, N-methylpyrrolidone, dimethylacetamide and hexamethylphosphoramide. Temperatures are from 40° C. to 160° C.

In a similar fashion sodium and potassium salts of butyric, caproic, capric, lauric, myristic, palmitic, stearic, arachidic, oleic, linoleic, linoelnic, and cerotic acids are reacted with 1,3-glyceryl dihalides wherein the 2-position is esterified respectively with caproic, arachidic, stearic, palmitic, myristic, palmitic, stearic, stearic, stearic, oleic, oleic and oleic acid.

For these reactions involving symmetrical dihalides, preferably from 2 to 10 moles of metal salt are employed per each mole of dihalide.

The process of this invention as described and illustrated above can be utilized in methods for forming specific triglycerides in which acyl group migration does not occur.

For example, symmetrical diacid triglycerides can be prepared by first reacting an acyl halide such as an acyl chloride,

with 1,3-dichloro-2-propanol or epichlorohydrin, to form a symmetrical glyceryl dihalide and then reacting that product according to the process of this invention. The conditions used for reaction of acyl chloride are not critical, and any conditions taught in the prior art or equivalent extension of such condition(s) derivable by a skilled practitioner can be used. Thus, the conditions taught by Carreau supra and extensions thereof can be utilized. For illustrative purposes, appropriate portions of Carreau supra are incorporated by reference as if fully set forth.

Unsymmetrical diacid triglycerides can be made by reacting two moles of acyl chloride, by the conditions discussed above, with 3-chloropropane-1,2-diol and then conducting the reaction of RCOOM as described herein on the unsymmetrical glyceryl monohalide thereby produced.

Furthermore, one can conduct a 3-step process whereby the triglyceride has one, two, or three acids esterified with glycerol hydroxyls depending on whether the acid, acyl chloride and acid salt utilized in the following sequence have the same or different organic groups bonded to the

linkage:
(a) react epihalohydrin such as epichlorohydrin with $RCO_2H$, preferably under conditions where esterification of the terminal hydroxy compound of glycerin is favored, i.e. by utilizing conditions where 3-halo-2-hydroxy-1-propyl carboxylate product predominates over the 2-propyl carboxylate isomer;
(b) reacting the product thereby produced—with or without separation of isomers—with acyl chloride as described above to produce a diester glyceryl halide;
(c) and then reacting that product, with or without isomer separation with a metal salt of a carboxylic acid as defined herein.

Reaction (a) can be conducted according to the teachings of companion application, Ser. No. 164,914, filed in the names of L. C. Mitchell, P. Kobetz, and William Burns. and having an even filing date with this application. That application describes how certain amines such as 2,6-lutidine are used to promote the formation of said 3-halo-2-hydroxy-1-propyl carboxylate such that that isomer predominates over the analogous 2-propyl carboxylate. The above-cited companion application in its entirety is incorporated by reference herein as if fully set forth.

What is claimed is:
1. Process for the formation of an ester, said process comprising reacting a glyceryl halide with an alkali metal carboxylate
(a) said glyceryl halide having the formula

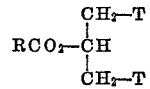

wherein T is selected from the class consisting of

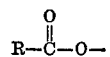

wherein R is a fatty acid group of from one to about 26 carbon atoms, and chlorine and bromine, such that at least one T is selected from chlorine and bromine, (b) said alkali metal carboxylate having the formula

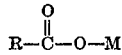

wherein R is as defined above and M is an alkali metal;

said process being conducted in the presence of hexamethylphosphoramide.

2. Process for preparing a diacid triglyceride, said process comprising reacting an acyl halide with a starting compound selected from epihalohydrin, 3-chloropropane-1,2-diol- or 1,3-dihalo-2-propanol, and subsequently reacting, in the presence of a dipolar aprotic solvent, the glyceryl halide thereby produced with an alkail metal carboxylate having the formula

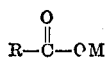

wherein R is a fatty acid group of from one to about 26 carbon atoms and M is an alkali metal.

3. Process of claim 1 for the formation of stearoyl-1,2-dipalmitan wherein said glyceryl halide is 3-chloropropane-1,2-diol dipalmitate, and said alkyl metal carboxylate is sodium stearate.

4. Process of claim 1 for the formation of 2-stearoyl-1,3-dipalmitan wherein said glyceryl halide is 1,3-dichloro-2-propyl stearate, and said alkali metal carboxylate is sodium palmitate.

References Cited

UNITED STATES PATENTS

| | | | |
|---|---|---|---|
| 2,399,959 | 5/1946 | Tucker | 260—410 |
| 3,418,360 | 12/1968 | Schulz et al. | 260—475 |
| 3,461,156 | 8/1969 | Fierce | 260—491 |

FOREIGN PATENTS

| | | |
|---|---|---|
| 1,590,151 | 5/1970 | France. |

OTHER REFERENCES

Chemical Abstracts, vol. 65, 9806d (1966).

LEWIS GOTTS, Primary Examiner

D. G. RIVERS, Assistant Examiner

U.S. Cl. X.R.

260—408, 410.8, 488 T, 491